(12) United States Patent
Saito

(10) Patent No.: US 6,302,328 B1
(45) Date of Patent: Oct. 16, 2001

(54) INFORMATION RECORDING-REPRODUCING APPARATUS

(75) Inventor: Makoto Saito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/352,875

(22) Filed: Jul. 13, 1999

(30) Foreign Application Priority Data

Jul. 16, 1998 (JP) .................................................. 10-219698
Jul. 16, 1998 (JP) .................................................. 10-219699

(51) Int. Cl.$^7$ .................................................. G06K 13/00
(52) U.S. Cl. .................................................. 235/475; 235/479
(58) Field of Search .................................................. 235/475, 479, 235/485, 456, 482, 483, 486; 369/2, 13, 258, 44.28

(56) References Cited

U.S. PATENT DOCUMENTS

| | | | |
|---|---|---|---|
| 4,933,537 | 6/1990 | Takahashi et al. | 369/13 |
| 5,350,910 | * 9/1994 | Kitai et al. | 235/479 |
| 5,808,981 | * 9/1998 | Suzuki | 369/44.28 |
| 5,990,596 | * 11/1999 | Kitai et al. | 310/316 |
| 6,130,874 | * 10/2000 | Saito | 235/454 |

FOREIGN PATENT DOCUMENTS 0 296 590 12/1988 (EP) .
03-256579 A * 11/1991 (JP) .
05-095685 A * 4/1993 (JP) .

* cited by examiner

*Primary Examiner*—Michael G. Lee
*Assistant Examiner*—Diane I. Lee
(74) *Attorney, Agent, or Firm*—Fitzpatrick, Cella, Harper & Scinto

(57) ABSTRACT

An information recording-reproducing apparatus is provided which effects any one of recording of information on an information recording medium and reproduction of the information from the information recording medium by a head while relatively moving a carriage, on which the information recording medium has been mounted, and the head, wherein the apparatus satisfies the following relationship $$Y<\{(0.8-3.0)/(800-150)\}X+3.5$$

wherein X is a velocity (mm/sec) of continuous movement of a moving member of the carriage or head, and Y is a movement distance (mm) of the center of gravity in the whole apparatus.

9 Claims, 4 Drawing Sheets

INFORMATION RECORDING-REPRODUCING APPARATUS

BACKGROUND OF THE INVENTION

1. Field of the Invention

The present invention relates to an information recording-reproducing apparatus which effects any one of recording of information on an information recording medium and reproduction of the information from the information recording medium by a head while relatively moving a carriage, on which the information recording medium has been mounted and the head.

2. Related Background Art

There have heretofore been a magnetic system and an optical system as conventional recording systems for information recording mediums. The information recording mediums are in the form of a tape, disk, card or the like. These recording systems and medium forms are properly used according to purpose. Magnetic cards of the magnetic system, which are information recording mediums in the form of a card, are excellent in ease of putting away and portability and are hence widely used in card systems such as cash dispensers.

In recent years, the quantity of information operated by the card systems has increased by the influence of an information-oriented age, and so it has been difficult to cope with such increase in quantity of information by magnetic cards. In addition, the magnetic cards are often forged and hence offer a great social problem. There is thus a demand for development of an information recording medium high in safety.

In view of the foregoing circumstances, attention is paid to an optical card which is an information recording medium of the optical system in the form of a card. The optical card has such merits as it has a capacity as large as several M bits, and is easy to mass produce and cheap. In addition, the optical card is of an additionally writing type and is hence incapable of rewriting information, thereby making forgery difficult and leaving histories. The optical card is an information recording medium high in safety even from these points of view.

An example of such a conventional optical card is illustrated in FIG. 1. FIG. 1 is a plan view of optical card C. The external shape of optical card C is rectangular. n (n being an integer of 2 or greater) information tracks $10_1, 10_2, 10_3, \ldots, 10_{n-1}, 10_n$ are arranged at intervals of several microns in parallel with one another in a direction parallel to the longer sides of optical card C.

An information recording-reproducing apparatus used for such an optical card is so designed that a light spot several $\mu$m in diameter is formed by a light beam between the information tracks of the optical card to record or reproduce information. The information recording-reproducing apparatus is also so designed that the optical card and an optical head are driven in directions perpendicular to each other to scan the optical card while causing the light beam to follow the information track in parallel.

As illustrated in, for example, FIG. 2, an opening 2 for taking an optical card C in and out is provided in a casing 1 of the conventional information recording-reproducing apparatus, and a carriage 3 mounting optical card C thereon is movably installed in the interior of casing 1. A pair of rollers 4 for taking optical card C on and out of carriage 3 is provided between opening 2 and carriage 3. The pair of rollers 4 is driven by a driving motor (not illustrated) and feeds optical card C, being held therebetween. An optical head 5, in which an optical pickup (not illustrated) has been installed, is provided above carriage 3. Optical head 5 serves to focus a laser beam on optical card C to record or reproduce information.

Optical card C is flatly held on carriage 3 to position and align it on carriage 3 in such a manner that the direction of the information tracks of optical card C accurately coincides with the moving direction of carriage 3. Carriage 3 is provided so as to permit its reciprocative rectilinear movement in the direction of the information tracks of optical card C, and optical head 5 is provided so as to permit its reciprocative rectilinear movement in a direction perpendicular to the direction of the information tracks of optical card C. Carriage 3 is driven by a driving mechanism comprised of a belt 6, pulleys 7a and 7b, a driving motor (not illustrated), etc., and optical head 5 is also driven by a driving mechanism (not illustrated). The moving range of carriage 3 is determined by a light-screening plate 8 provided on the lower surface of carriage 3 and optical sensors 9a and 9b provided on the base of casing 1.

Incidentally, in the above-described information recording-reproducing apparatus, carriage 3 is moved in the direction of the information tracks of optical card C, and optical head 5 is moved in the direction perpendicular to the information tracks of optical card C. However, there is also known an information recording-reproducing apparatus in which carriage 3 is moved in a direction perpendicular to the information tracks of optical card C, and optical head 5 is moved in the direction of the information tracks of optical card C.

On the other hand, with the development of digital communication techniques and the servicing of communication networks in recent years, information apparatus called mobile equipment are positively used not only indoors but also outdoors. From such a point of view, the above-described information recording-reproducing apparatus is also required to make it possible to be positively used outdoors for making the best use of the excellent portability of optical card C. Therefore, it is desirable that the information recording-reproducing apparatus be made small in size and light in weight to improve its portability and can be held in one hand so as to be easily operated.

In the conventional information recording-reproducing apparatus, however, carriage 3 and optical head 5 are relatively moved, and so the center of gravity of the apparatus comes to move repeatedly. Therefore, when an operator holds the apparatus in his hand to operate it, the operability and stability thereof become poor, and the apparatus may fall from the hand to break down in the worst case. In this case, if the mass of the apparatus may be reduced to, for example, about 100 g, the influence by the movement of the center of gravity is lightened to prevent the operability and stability from being deteriorated. It is however difficult under circumstances to actually reduce the mass of the apparatus to lighter than 300 g.

In order to improve such a problem, it is considered to join a balance weight, which has the same mass as carriage 3 or optical head 5 and interlocks in an opposite direction, to carriage 3 or optical head 5. However, in this case, the driving motor for driving carriage 3 or optical head 5 comes to drive the balance weight as well, and so it is necessary to make the driving motor larger. Accordingly, a new mass of the balance weight and moreover an increased mass by the enlargement in size of the driving motor are added to the mass of the apparatus. It is hence expected that the mass and size of the apparatus are increased to impair the portability thereof.

SUMMARY OF THE INVENTION

It is an object of the present invention to provide an information recording-reproducing apparatus which can solve the above-described problems involved in the prior art and has high operability and stability upon operation with the apparatus held in an operator's hand.

The above object can be achieved by the present invention described below.

According to a first embodiment of the present invention, there is provided an information recording-reproducing apparatus which effects at least any one of recording of information on an information recording medium and reproduction of the information from the information recording medium by a head while relatively moving a carriage, on which the information recording medium has been mounted, and the head, wherein the apparatus satisfies the following relationship $$Y < \{(0.8-3.0)/(800-150)\}X + 3.5$$

wherein X is a velocity (mm/sec) of continuous movement of a moving member comprised of the carriage or head, and Y is a movement distance (mm) of the center of gravity in the whole apparatus.

According to a second embodiment of the present invention, there is provided an information recording-reproducing apparatus which effects at least any one of recording of information on an information recording medium and reproduction of the information from the information recording medium by a head while relatively moving a carriage, on which the information recording medium has been mounted, and the head, wherein the apparatus satisfies the following relationship $$Z < \{(0.014-0.045)/(800-150)\}X + 0.052$$

wherein X is a velocity (mm/sec) of continuous movement of a moving member comprised of the carriage or the head, and Z is a mass ratio of the moving member to the whole apparatus.

DESCRIPTION OF THE PREFERRED EMBODIMENTS

Figure 1:
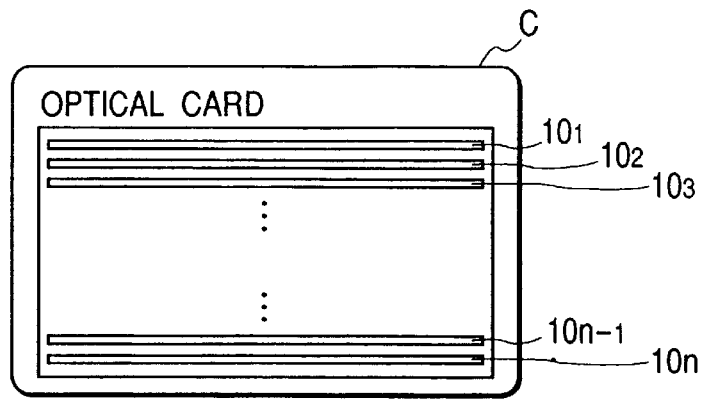
FIG. 1 is a plan view illustrating an example of the conventional optical cards.
Figure 2:
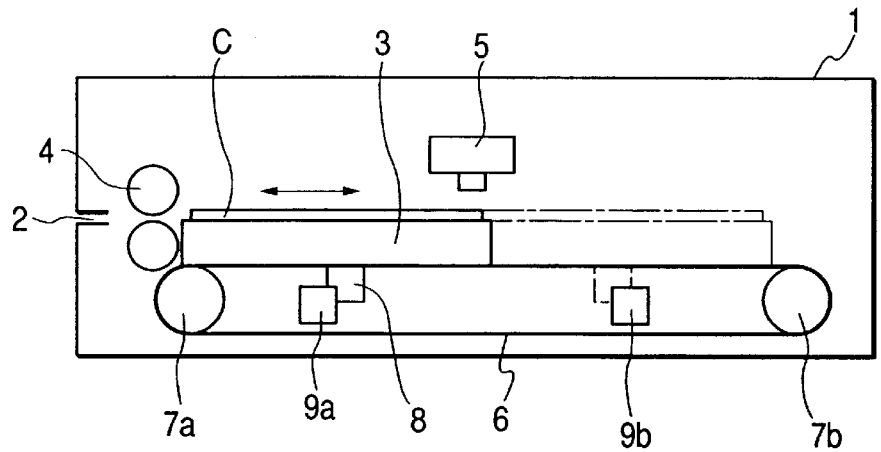
FIG. 2 is a schematic view illustrating an example of the conventional information recording-reproducing apparatus making use of the optical card shown in FIG. 1.

The present invention will hereinafter be described in detail on the basis of the embodiments. In the following embodiments, the conventional optical card illustrated in FIG. 1 is used as an information recording medium.

Figure 3:
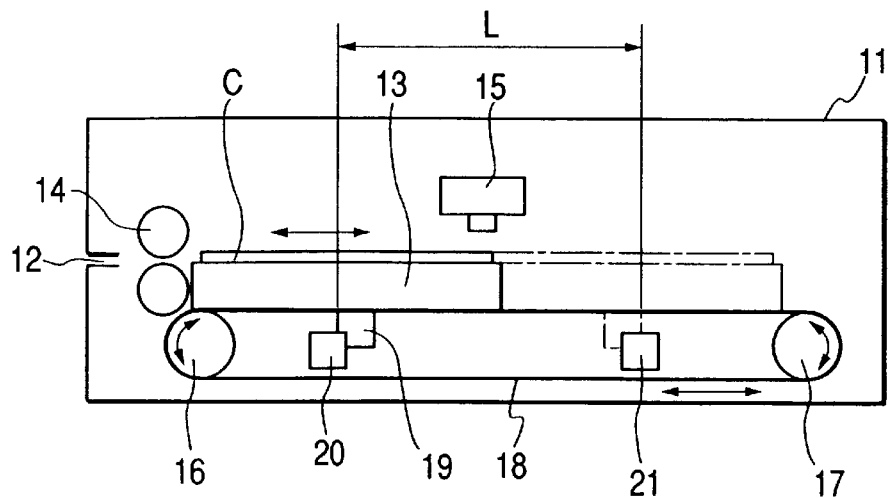
FIG. 3 is a schematic view illustrating an information recording-reproducing apparatus according to the first embodiment of the present invention.

FIG. 3 is a fragmentary sectional view of an information recording-reproducing apparatus according to the first embodiment of the present invention. As an information recording medium, there is used such an optical card C of a credit card size as illustrated in FIG. 1, which optically records and/or reproduces information. An opening 12 for causing optical card C to go through a casing 11 of the information recording-reproducing apparatus is provided in a side of casing 11, and a carriage 13 mounting optical card C thereon is movably installed in the interior of casing 11. A pair of rollers 14 as a feeding means for taking optical card C on and out of carriage 13 is provided in the vicinity of opening 12 in the interior of casing 11. The pair of rollers 14 is driven by a driving motor (not illustrated) and feeds optical card C with it held therebetween. An optical head 15, in which an optical pickup (not illustrated) has been installed, is movably provided above carriage 13.

Carriage 13 is provided so as to permit its reciprocative rectilinear movement in the direction of the information tracks of optical card C, and optical head 15 is provided so as to permit its reciprocative rectilinear movement in a direction perpendicular to the moving direction of carriage 13. A belt 18 supported by a pair of pulleys 16 and 17 is joined to carriage 13, and any one of pulleys 16 and 17 is connected to a driving motor (not illustrated). Optical head 15 is also driven by a driving mechanism similar to that used in carriage 13.

A light-screening plate 19 is provided so as to project from the lower surface of carriage 13, and optical sensors 20 and 21 for detecting the position of light-screening plate 19 are installed with an interval on casing 11. A distance L between optical sensors 20 and 21 is equal to or somewhat shorter than the length of each information track of optical card C extending longitudinally, and carriage 13 moves between optical sensors 20, 21. Optical head 15 focuses a laser beam on optical card C during the relative movement of carriage 13 to optical head 15, thereby effecting recording or reproduction of information to optical card C.

In this apparatus, the mass of the moving member, which is carriage 13 or optical head 15, is controlled to about 50 g in the maximum and to about 10 g in the minimum because of the limitation of practicable production. The mass of the whole apparatus is controlled to about 1.2 kg in the maximum in view of the portability of the apparatus and to about 0.3 kg in the minimum because of the limitation of practicable production.

The minimum velocity of the moving member is controlled to about 150 mm/sec for making it possible to reproduce information by irradiating optical card C with a laser beam. The maximum velocity of the moving member is controlled to about 800 mm/sec because of the mass and size of the driving motor installed in view of the portability of the apparatus.

The stability of the information recording-reproducing apparatus of such a construction as mentioned above was tested by 20 operators. As a result, results shown in the following Table 1 were able to be obtained. In the table, the row represents a velocity X (mm/sec) of continuous reciprocative movement of carriage 13, and the column represents a movement distance Y (mm) of the center of gravity in the whole apparatus. In the test, the apparatus was ranked as C where the number of operators who felt the vibration of the apparatus was ten or more, B where the number of operators who felt so was not less than four, but less than ten, or A where the number of operators who felt so was not more than three.

TABLE 1

| Y | X | | | | |
|---|---|---|---|---|---|
| | 150 | 300 | 450 | 600 | 800 |
| 0.6 | | | | | A |
| 0.7 | | | | | A |
| 0.8 | | | | | B |
| 0.9 | | | | | C |
| 1.0 | | | | | C |
| 1.5 | | | | A | |
| 1.6 | | | | A | |
| 1.7 | | | | B | |
| 1.8 | | | | C | |
| 1.9 | | | A | | |
| 2.0 | | | A | | |
| 2.1 | | | A | | |
| 2.2 | | | B | | |
| 2.3 | | A | C | | |
| 2.4 | | A | | | |
| 2.5 | | B | | | |
| 2.6 | | B | | | |
| 2.7 | | C | | | |
| 2.9 | A | | | | |
| 3.0 | A | | | | |
| 3.1 | B | | | | |
| 3.2 | B | | | | |
| 3.3 | C | | | | |

Figure 4:
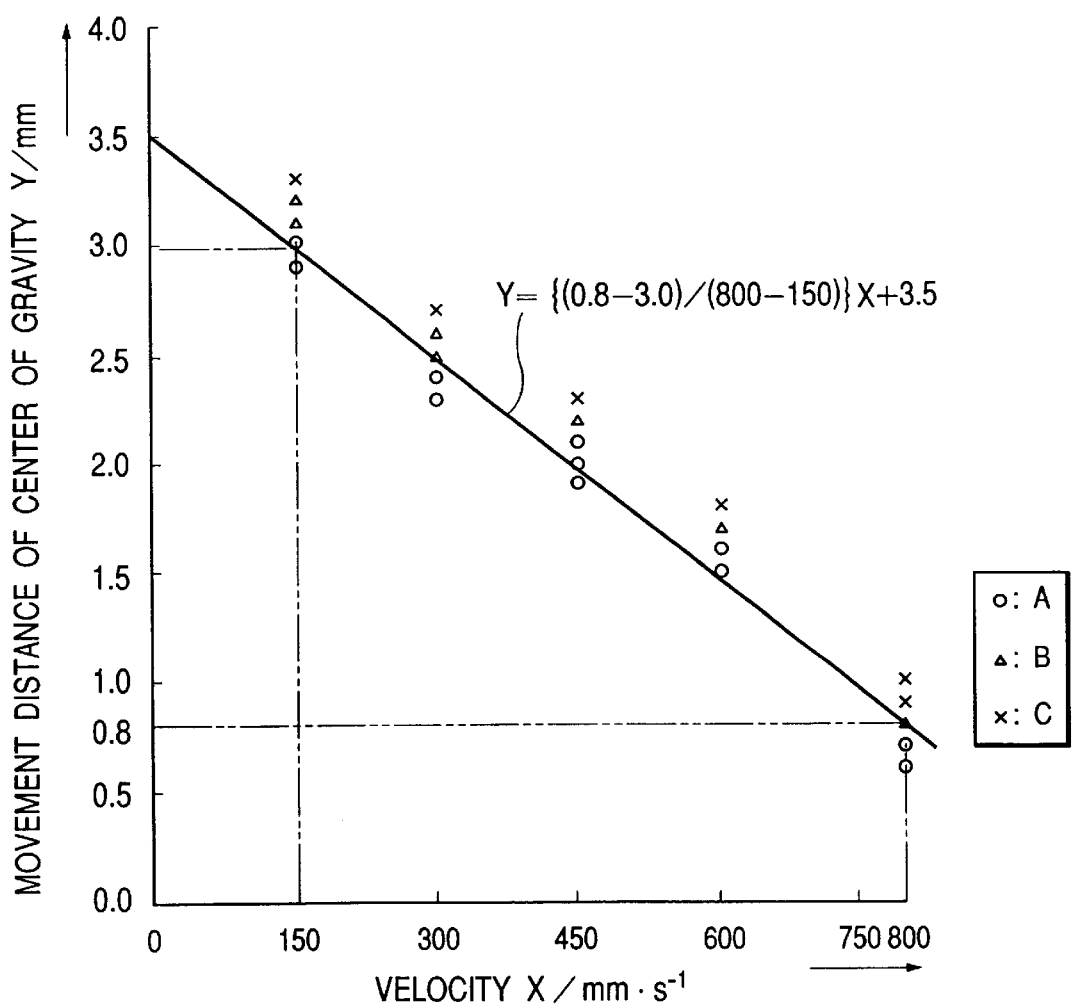
FIG. 4 diagrammatically illustrates the relationship between the velocity of a moving member and the movement distance of the center of gravity in the apparatus in the first embodiment.

When Table 1 is graphed, a graph illustrated in FIG. 4 is obtained. From Table 1 and FIG. 4, a characteristic line can be obtained by connecting a point where the moving velocity X is 150 mm/sec and the movement distance Y of the center of gravity is 3.0 mm and a point where the moving velocity X is 800 mm/sec and the movement distance Y of the center of gravity is 0.8 mm, by a straight line. This characteristic line can be expressed by a numerical formula as follows:

$$Y = \{(0.8-3.0)/(800-150)\}X + 3.5$$

Accordingly, when the apparatus is designed so as to satisfy the following relationship:

$$Y < \{(0.8-3.0)/(800-150)\}X + 3.5,$$

the stability and operability of the apparatus upon operation with the apparatus held in an operator's hand become the best, and as a result the apparatus is prevented from falling from the operator's hand. When the mass of the whole apparatus is controlled to 1.2 kg or lighter, the portability of the apparatus is not impaired.

The second embodiment of the present invention, in which the construction of the apparatus is defined from a different point of view from the first embodiment, will hereinafter be described. The information recording-reproducing apparatus according to the second embodiment also has exactly the same construction as that shown in FIG. 3.

As described above, in such an information recording-reproducing apparatus as illustrated in FIG. 3, mass $m1$ of a moving member, which is carriage 13 or optical head 15, is controlled to about 50 g in the maximum and to about 10 g in the minimum because of the limitation of practicable production. Mass $m2$ of the whole apparatus is controlled to about 1.2 kg in the maximum in view of the portability of the apparatus and to about 0.3 kg in the minimum because of the limitation of practicable production.

The minimum velocity of the moving member is controlled to about 150 mm/sec for making it possible to reproduce information by irradiating optical card C with a laser beam. The maximum velocity of the moving member is controlled to about 800 mm/sec because of the mass and size of the driving motor installed in view of the portability of the apparatus.

The stability of the information recording-reproducing apparatus of such a construction as mentioned above was tested by 20 operators. Results shown in the following Table 2 were able to be obtained. In the table, the row represents a velocity X (mm/sec) of continuous reciprocative movement of carriage 13, and the column represents a mass ratio Z. In the second embodiment, mass ratio Z is a mass ratio $m1/m2$ of carriage 13 to the whole apparatus. In the test, the apparatus was ranked as C where the number of operators who felt the vibration of the apparatus was ten or more, B where the number of operators who felt so was not less than four, but less than ten, or A where the number of operators who felt so was not more than three.

TABLE 2

| Z | X | | | | |
|---|---|---|---|---|---|
| | 150 | 300 | 450 | 600 | 800 |
| 0.013 | | | | | A |
| 0.014 | | | | | A |
| 0.015 | | | | | B |
| 0.016 | | | | | C |
| 0.022 | | | | A | |
| 0.023 | | | | A | |
| 0.024 | | | | B | |
| 0.025 | | | | B | |
| 0.026 | | | | C | |
| 0.029 | | | A | | |
| 0.030 | | | A | | |
| 0.031 | | | B | | |
| 0.032 | | | C | | |
| 0.033 | | | C | | |
| 0.037 | | A | | | |
| 0.038 | | A | | | |
| 0.039 | | B | | | |
| 0.040 | | B | | | |
| 0.044 | A | | | | |
| 0.045 | A | | | | |
| 0.046 | B | | | | |
| 0.047 | B | | | | |
| 0.048 | C | | | | |

Figure 5:
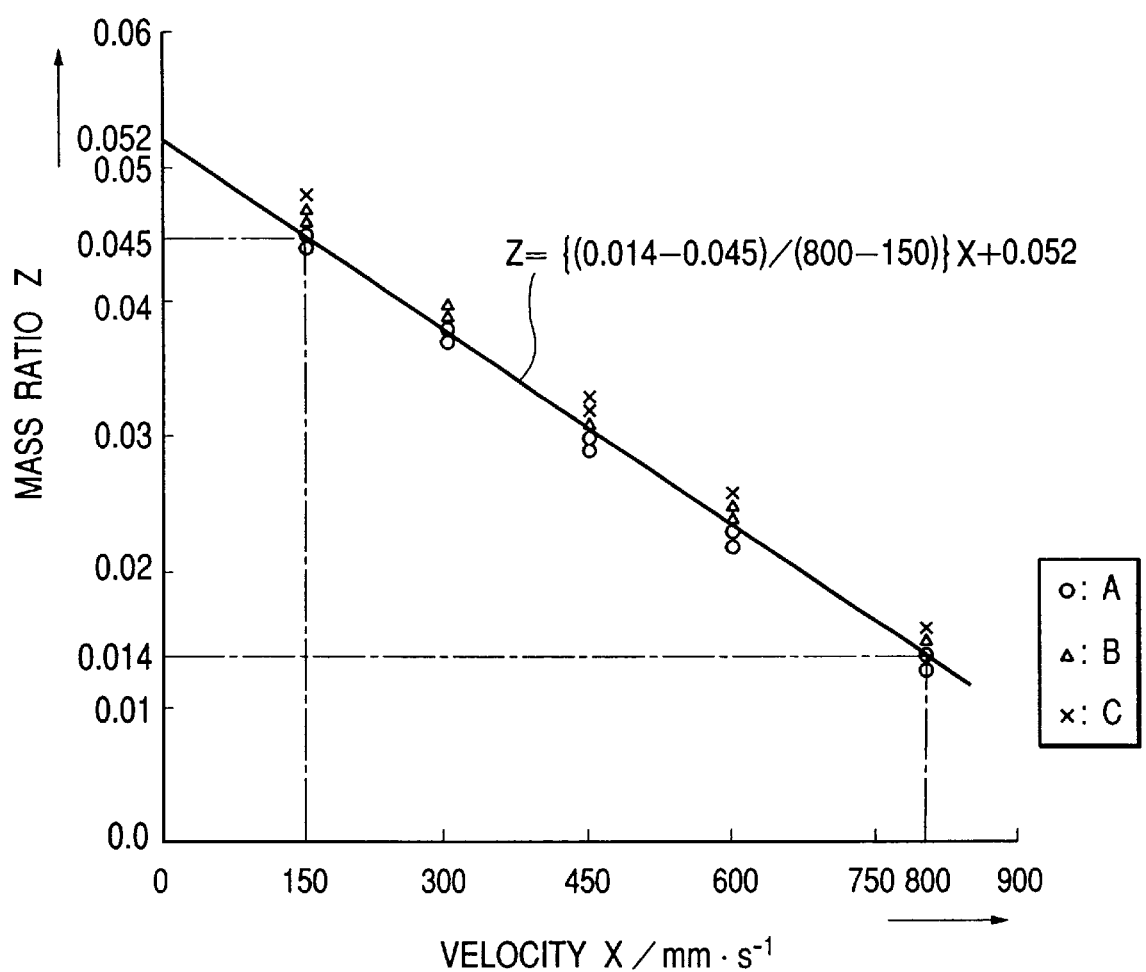
FIG. 5 diagrammatically illustrates the relationship between the velocity of a moving member and the mass ratio of the moving member to the apparatus in the second embodiment of the present invention.

When Table 2 is graphed, a graph illustrated in FIG. 5 is obtained. From Table 2 and FIG. 5, a characteristic line can be obtained by connecting a point where moving velocity X is 150 mm/sec and mass ratio Z is 0.045 mm and a point where moving velocity X is 800 mm/sec and mass ratio Z is 0.014, by a straight line. This characteristic line can be expressed by a numerical formula as follows:

$$Z = \{(0.014-0.045)/(800-150)\}X + 0.052$$

Accordingly, when the apparatus is designed so as to satisfy the following relationship:

$$Z < \{(0.014-0.045)/(800-150)\}X + 0.052,$$

the stability and operability of the apparatus upon operation with the apparatus held in an operator's hand become the best, and as a result the apparatus is prevented from falling from the operator's hand. When mass $m2$ of the whole apparatus is controlled to 1.2 kg or lighter, the portability of the apparatus is not impaired.

Figure 6:
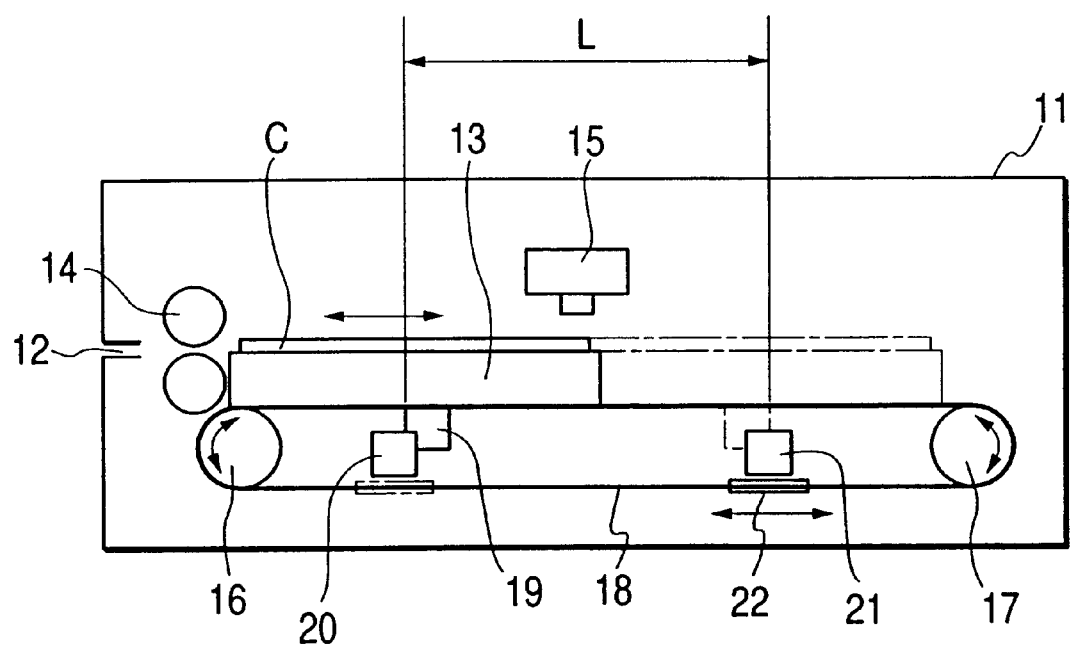
FIG. 6 is a schematic view illustrating an information recording-reproducing apparatus according to a third embodiment of the present invention.

FIG. 6 is a fragmentary sectional view illustrating an information recording-reproducing apparatus according to the third embodiment of the present invention. In this embodiment, the apparatus has the same construction as the apparatus shown in FIG. 3 except that a balance weight 22 is attached to belt 18. Therefore, in FIG. 6, like reference numerals are given to the same members as those illustrated in FIG. 3, and detailed descriptions thereof are omitted.

Mass m3 of balance weight 22 is adjusted so as to be lighter than mass m1 of carriage 13, and balance weight 22 is fixed to the lower stage of belt 18, thereby making it possible to move balance weight 22 in a direction opposite to the moving direction of carriage 13.

The stability of the information recording-reproducing apparatus of such a construction was tested in the same manner as in the second embodiment. As a result, exactly the same results as those shown in Table 2 were able to be obtained. However, moving velocity X of the row was the same as in Table 2, but mass ratio Z of the column was defined as a mass ratio (m1−m3)/m2 obtained by subtracting a mass ratio m3/m2 of the balance weight to the whole apparatus from a mass ratio m1/m2 of carriage 13 to the whole apparatus.

Accordingly, the same characteristic line and numerical formula as those in the second embodiment can also be obtained in the third embodiment. When the apparatus is designed so as to satisfy the following relationship:

$$Z < \{(0.014-0.045)/(800-150)\}X+0.052,$$

the same effect as in the second embodiment can be achieved.

Since mass m3 of balance weight 22 is adjusted so as to be lighter than mass m1 of carriage 13 in this case, the driving motors for driving carriage 13 and balance weight 22 can be held down to that small in size and light in weight, and so the portability of the apparatus is not impaired.

In the above-described first to third embodiments, the combination of optical card C and optical head 15 has been described. However, the present invention is not limited to this combination. Accordingly, even when an information recording medium of any other card form, for example, a magnetic card is used in place of optical card C, and a magnetic head is used in place of optical head 15, the same effect can be achieved.

In the first to third embodiments, the construction that the carriage is moved in a direction parallel to the extending direction of the information tracks has been adopted. However, a construction that the head is moved in a direction parallel to the extending direction of the information tracks may also be adopted in place of the above construction.

What is claimed is:

1. An information recording-reproducing apparatus which effects at least any one of recording of information on an information recording medium and reproduction of the information from the information recording medium by a head while relatively moving a carriage, on which the information recording medium has been mounted, and the head, wherein the apparatus satisfies the following relationship $$Y < \{(0.8-3.0)/(800-150)\}X+3.5$$

wherein X is a velocity (mm/sec) of continuous movement of a moving member comprised of the carriage or the head, and Y is a movement distance (mm) of the center of gravity in said information recording-reproducing apparatus.

2. The information recording-reproducing apparatus according to claim 1, wherein the information recording medium is comprised of an optical card in which a plurality of rectilinear information tracks are juxtaposed with one another, and the moving member is moved in a direction parallel to the extending direction of the information tracks.

3. The information recording-reproducing apparatus according to claim 2, wherein the moving member is comprised of the carriage on which the optical card has been mounted, and the carriage is fixed to a belt being extended between a pair of pulleys and moved by rotating one of the pulleys on its axis by a driving motor.

4. The information recording-reproducing apparatus according to claim 2, wherein the head is comprised of an optical head which irradiates the optical card with a laser beam.

5. An information recording-reproducing apparatus which effects at least any one of recording of information on an information recording medium and reproduction of the information from the information recording medium by a head while relatively moving a carriage, on which the information recording medium has been mounted, and the head, wherein the apparatus satisfies the following relationship $$Z < \{(0.014-0.045)/(800-150)\}X+0.052$$

wherein X is a velocity (mm/sec) of continuous movement of a moving member comprised of the carriage or the head, and Z is a mass ratio of the moving member to said information recording-reproducing apparatus.

6. The information recording-reproducing apparatus according to claim 5, wherein the information recording medium is comprised of an optical card in which a plurality of rectilinear information tracks are juxtaposed with one another, and the moving member is moved in a direction parallel to the extending direction of the information tracks.

7. The information recording-reproducing apparatus according to claim 6, wherein the moving member is comprised of the carriage on which the optical card has been mounted, and the carriage is fixed to a belt being extended between a pair of pulleys and moved by rotating one of the pulleys on its axis by a driving motor.

8. The information recording-reproducing apparatus according to claim 7, wherein a balance weight having a mass m3 lighter than mass m1 of the carriage is attached to the belt, and Z is expressed by (m1−m3)/m2 in which m2 is a mass of the whole apparatus.

9. The information recording-reproducing apparatus according to claim 6, wherein the head is comprised of an optical head which irradiates the optical card with a laser beam.

* * * * *